United States Patent [19]

Gan et al.

[11] Patent Number: 5,256,730

[45] Date of Patent: Oct. 26, 1993

[54] METHOD OF PRODUCING CONDUCTIVE POLYMERS IN MICROEMULSIONS

[75] Inventors: Leong-Ming Gan; Hardy S. O. Chan; Chwee-Har Chew; Liren Ma, all of Singapore, Singapore

[73] Assignee: National University of Singapore, Singapore

[21] Appl. No.: 906,846

[22] Filed: Jun. 30, 1992

[51] Int. Cl.⁵ ............................................. C08L 75/04
[52] U.S. Cl. .................................... 524/800; 524/801; 528/422; 427/58; 427/52; 427/63; 427/126.1
[58] Field of Search ............... 524/800, 801; 528/422; 427/58, 62, 63, 126.1

[56] References Cited

U.S. PATENT DOCUMENTS

| | | | |
|---|---|---|---|
| 4,818,646 | 4/1989 | Takakubo et al. | 429/213 |
| 4,847,115 | 7/1989 | Warren et al. | 427/121 |
| 4,936,181 | 6/1990 | Theophilou et al. | 264/104 |
| 4,937,060 | 6/1990 | Kathirgamanathan et al. | 428/403 |
| 4,940,517 | 7/1990 | Wei | 528/422 X |
| 4,959,162 | 9/1990 | Armes et al. | 252/519 |
| 4,959,180 | 9/1990 | Armes et al. | 252/519 |
| 5,006,278 | 4/1991 | Eisenbaumer | 427/385.5 |
| 5,008,041 | 4/1991 | Cameron et al. | 252/500 |
| 5,021,193 | 6/1991 | Armes et al. | 252/500 |

OTHER PUBLICATIONS

S. P. Armes et al, "Aqueous Colloidal Dispersions of Polyaniline Formd by Using Poly(vinyl-pyridine)-Based Steric Stabilizers" Langmuir 1990, vol. 6, No. 12, pp. 1745-1749.

*Primary Examiner*—Maurice J. Welsh
*Attorney, Agent, or Firm*—Lowe, Price, LeBlanc & Becker

[57] ABSTRACT

Methods for preparing highly conductive polymers in water-in-oil microemulsions are disclosed. The invention is particularly useful for preparing conductive polyaniline in the forms of fine particles, membrane composites and coatings on electrodes. The composites and the coatings of the polyaniline have been shown to exhibit conductivities in the range of 150–400 S cm$^{-1}$.

8 Claims, 1 Drawing Sheet

METHOD OF PRODUCING CONDUCTIVE POLYMERS IN MICROEMULSIONS

FIELD OF THE INVENTION

The present invention relates to the field of conductive polymers. More specifically, the invention relates to processes of producing polyaniline and its derivatives having improved properties, such as increased electrical conductivity.

BACKGROUND OF THE INVENTION

Conductive polyaniline known as emeraldine salt is typically prepared by oxidation of aniline in aqueous acidic media using ammonium persulfate or potassium dichromate. The salt is intractable because of its insolubility and decomposition without melting. However, the undoped (unprotonated) polyaniline known as emeraldines base is not electrically conductive. But the base is slightly soluble in polar solvents such as dimethyl formamide, dimethyl sulfoxide and n-methylpyrrolidinone.

It has been reported that conductive polyaniline prepared in the form of colloidal dispersions using steric stabilizers enhances its processibility. See, for example, Armes, S. P., Aldissi, M., Agnew, S., and Gottesfeld, S., Langmuir, 1990, 6, 1745-1749, and the disclosure of U.S. Pat. No. 4,959,180. Both the chemical and electrochemical synthesis of electrically conducting polyaniline have been described in U.S. Pat. No. 4,940,517. The process of making oriented films of improved conductive polyaniline on the surface of a stretchable support material has also been disclosed in U.S. Pat. No. 4,935,181.

It is an object of this invention to provide methods of producing conductive polymers of improved properties by microemulsion polymerization of the monomers under different conditions.

SUMMARY OF THE INVENTION

The methods for producing and thereby substantially increasing the electrical conductivities of conductive polymeric materials, such as polyaniline, have been found. The methods of this invention involve the principles of oxidative and electrochemical polymerization of monomers, such as aniline, in the stable microemulsions via diffusion of the reactants to the interfaces. The interfaces may arise from the contacts of microemulsion/microemulsion, microemulsion/polymer membrane and microemulsion/electrode.

The conductive polyaniline prepared by this invention can be in the forms of fine particles, films coated on electrodes, and polyaniline/polymer membrane composites. The finished products show high electrical conductivities, especially those prepared by the latter two forms.

The fine particles of polyaniline are produced directly in the specially prepared microemulsions by this invention. Two microemulsions, each containing aniline and an oxidant, are prepared separately. Polymerization occurs readily after mixing these two microemulsions.

The polyaniline films firmly coated on electrodes are obtained by electrochemical polymerization of aniline dissolved in the specially prepared microemulsions. It is preferable that the difference in the potential between the anode and the cathode be about 1 volt.

BRIEF DESCRIPTION OF THE DRAWINGS

The polyaniline/polymer membrane composites are made from two microemulsions, each containing aniline and an oxidant, and a polymer membrane using the device as illustrated in FIG. 1.

Since surfactant is used in every microemulsion, the products of polyaniline can easily be washed with water and/or a short chain alcohol to remove the residual surfactant. The washed products can be doped again with 1M HCl solutions to increase their electrical conductivities.

DETAILED DESCRIPTION OF THE INVENTION

Figure 1A:
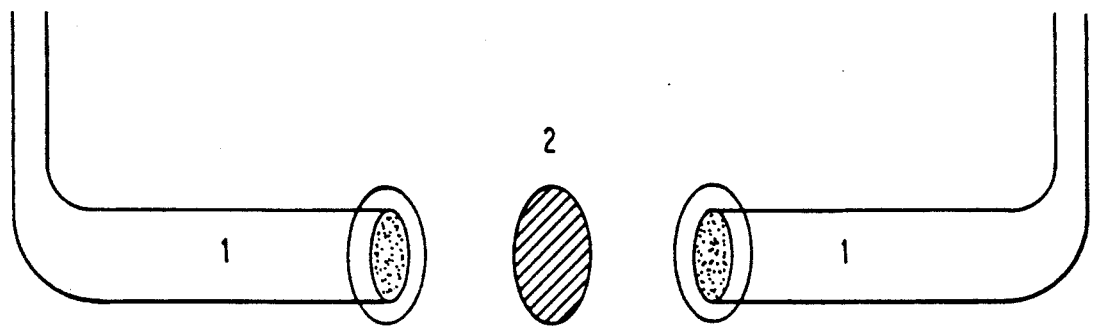

The present invention concerns method of preparing films and coatings of conductive polymers and polymer composites by oxidative and electrochemical polymerizations in microemulsions. A variety of oxidatively polymerizable monomers, such as pyrrole, thiophene, aniline and their derivatives can be performed by this invention. Aniline is particularly preferred as an amino-substituted aromatic monomer.

Microemulsions are transparent or translucent dispersions of water, oil, surfactant and often with a cosurfactant. They form spontaneously upon mixing the appropriate type and amount of the components. Most of the microemulsions are thermodynamically stable. The microdomains of microemulsions are believed to be roughly spherical droplets (8-20 nanometers in diameter) of oil or water dispersed in the continuous medium of water or oil respectively. Due to the dynamic nature of the microemulsion, the reacting species solubilized in the droplets can mix and react rapidly to form fine particles of different materials.

The polymerization of aniline can be carried out in water-in-oil microemulsions to produce very fine particles of polyaniline in the range of 10 to 30 nanometers in diameter. The choice of a surfactant and an oil are very crucial to the stability of microemulsion polymerization of aniline. Nonionic surfactants, such as poly(oxyethylene)$_x$ nonyl phenol ether, are effective in stabilizing the microemulsion systems using petroleum ether. Other hydrocarbons can also be used as oils.

The main microemulsion hereby referred as "Microemulsion I" consists of an appropriate amount of the surfactant, aniline dissolved in dilute HCl aqueous solution and the oil. The other microemulsion hereby referred as "Microemulsion II" contains the similar amounts of the surfactant and the oil as in "Microemulsion I", and an aqueous solution of an oxidant.

Polymerization of aniline occurs readily upon mixing Microemulsions I and II at room temperature (25°-30° C.), although the polymerization may be conducted at higher or lower temperatures if desired. The mixed microemulsions are stable during the polymerization. The polyaniline particles can easily be precipitated out from the mixed microemulsions by adding a small amount of a short chain alcohol to the system. The precipitated particles are washed with distilled water and/or a short chain alcohol to remove the residual surfactant and the oxidant. The pressed pellets of the dried polyaniline powder have solid-state conductivities in the range of 6 to 12 siemems per centimeter (S $cm^{-1}$). as determined by the standard four-point probe method.

Aniline prepared as in the above-mentioned "Microemulsion I" can also be electrochemically polymerized by the cycling potential method. In the present invention, it is preferable that the difference in the potential between the anode and the cathode be about 1 volt. The electrical conductivity of the polyaniline coated on the electrode is as high as about 400 S cm$^{-1}$).

When the above-mentioned "Microemulsion I" and "Microemulsions II" are separated by a polymer membrane, interfacial polymerization of aniline occurs readily via diffusion of the reactants to the interfaces from both sides of microemulsions.

Figure 1B:
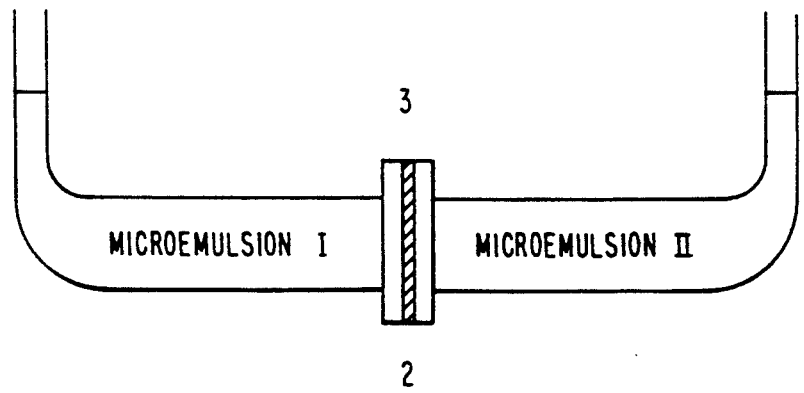

FIG. 1 illustrates the device used for the interfacial polymerization. Two modified flat ground-glass tubes I are used for holding microemulsion I and microemulsions II which are separated by a polymer membrane 2. The whole apparatus is tightly secured by clamp holders 3. As the interfacial polymerization of aniline proceeds, the polymer membrane will eventually be firmly covered with a film of polyaniline to produce a polyaniline/polymer membrane composite. This type of interfacial polymerization of aniline in microemulsions can be applied to different types of membranes, such as cellulose membrane. These polyaniline film composites can easily be washed with water and/or a short chain alcohol, and doped again with dilute HCl solutions. The electrical conductivities of these film composites are as high as from about 250 to about 400 S cm$^{-1}$ for those polymerized for 2 to 3 days at room temperature (25°-30° C.).

The methods of this invention are further illustrated in the following examples, which are not intended to limit the scope of this invention.

EXAMPLE 1

Microemulsion I consisted of 15 wt. % of 2M HCl aqueous solution which dissolved 5 wt. % aniline, 55 wt. % petroleum ether (b.p. 60°-80° C.) and 30 wt. % NP-5 [poly(oxyethylene)s nonyl phenol ether]. Microemulsion II consisted of 15 wt. % of an aqueous solution of 5 wt. % of potassium persulfate, 55 wt. % of petroleum ether (b.p. 60°-80° C.) and 30 wt. % NP-5. The weight ratio of Microemulsion I to Microemulsion II at 1 to 3 was mixed at room temperature (25°-30° C.) with or without stirring. Polymerization of aniline occurred as the color changed from clear to yellowish green and finally dark green. Only slight fine precipitates were observed after about one day of polymerization. Very fine particles of polyaniline were precipitated out by adding a small amount of ethanol. The particles were repeatedly washed with ethanol and finally with distilled water. The washed polyaniline particles were redispersed and doped again with 2M HCl solution. The electrical conductivity of the doped polyaniline in the form of pressed pellet was about 12 S cm$^{-1}$.

EXAMPLE 2

The glass tubes with cellulose membrane secured in between them for the device, as shown in FIG. 1 were separately filled with Microemulsion I and Microemulsion II. Color change at the interfaces of the membrane signalled the onset of interfacial polymerization of aniline via diffusion of reactants to the interfaces from both sides of the microemulsions at room temperature. Polyaniline particles formed inside the pores of the membrane and eventually covered up the surface of the membrane to produce a firm film of polyaniline/cellulose membrane composite. The electrical conductivity of the film composite varied with the times of polymerization, washing with ethanol and water, and redoping with 2M HCl solution. For instance, the thoroughly washed film composite which was prepared from 2 days of polymerization had an electrical conductivity of 248 S cm$^{-1}$ and it increased to about 354 S cm$^{-1}$ after doping again with 2M HCl.

EXAMPLE 3

The procedure of Example 2 was followed, except Microemulsion II was replaced by an aqueous solution of 5 wt. % potassium persulfate. The electrical conductivities of the polyaniline/membrane composites were 141, 91 and 154 S cm$^{-1}$ for the unwashed, washed samples and the one redoped with 2M HCl solution respectively.

EXAMPLE 4

The procedure of Example 2 was followed, except Microemulsion II was replaced by an aqueous solution of 5 wt. % aniline dissolved in 2M HCl. The electrical conductivities of the polyaniline/membrane composites were 134, 89 and 139 S cm$^{-1}$ for the unwashed, washed samples and the one redoped with 2M HCl solution respectively.

EXAMPLE 5

Aniline in Microemulsion I was electrochemically polymerized in a conventional cell. A platinum plate was the counter electrode and a standard calomel electrode (SEC) served as the reference electrode. The potential was cycling from $-0.2$ V to $+0.8$ V at a sweep rate of 50 mV s$^{-1}$ at room temperature for about 2 hours. After the polymerization, the polyaniline firmly coated on the platinum electrode was washed with ethanol. The electrical conductivity of the polyaniline having a thickness of 2 to 3 $\mu$m was as high as 400 S cm$^{-1}$.

What is claimed is:

1. A method for producing conductive polymers, said conductive polymers being polyaniline and substituted polyanilines, which method comprises the steps of:
    (a) producing said conductive polymers in a water-in-oil microemulsions by polymerizations of aniline and substituted anilines using potassium persulfate as an oxidant;
    (b) recovering said conductive polymers from the microemulsions; and
    (c) doping said conductive polymers with the protonating acids to render the polymers more conductive.

2. The method of claim 1, where said substituted anilines are o-aminobenzyl alcohol, o-chloroaniline and o-methoxy-aniline, while said substituted polyanilines are poly(o-aminobenzyl alcohol), poly(o-chloroaniline) and poly(o-methoxyaniline).

3. The method of claim 1, where said microemulsions are stabilized by alkylphenol ethoxylates possessing a value of hydrophilic-lipophilic balance (HLB) ranging from 4 to 15.

4. The method of claim 1, where the oils used in the said microemulsions are hydrocarbon compounds having carbon atoms ranging from 5 to 14 or a mixture of the said oils.

5. The method of claim 1, where said conductive polymers are prepared in the forms of dispersions or dried fine particles.

6. The method of claim 1, where said conductive polymers are prepared as polymer composites by coating said conductive polymers on polycarbonate membranes or mixed esters of cellulose membranes.

7. The method of claim 6, which can be obtained using either two-microemulsion method or single-microemulsion method.

8. The method of claim 1, where said conductive polymers are electrochemically coated on metallic and carbon fiber electrodes.

* * * * *